May 4, 1926.

W. J. GROTENHUIS

AUTOMOBILE REAR BUMPER

Filed Jan. 7, 1926

1,582,981

Witness:
Chas. R. Toursh

Inventor,
William J. Grotenhuis

Patented May 4, 1926.

1,582,981

UNITED STATES PATENT OFFICE.

WILLIAM J. GROTENHUIS, OF CHICAGO, ILLINOIS, ASSIGNOR TO BIFLEX PRODUCTS CORPORATION, OF WAUKEGAN, ILLINOIS, A CORPORATION OF DELAWARE.

AUTOMOBILE REAR BUMPER.

Application filed January 7, 1926. Serial No. 79,727.

*To all whom it may concern:*

Be it known that I, WILLIAM J. GROTENHUIS, a citizen of the United States of America, and a resident of Chicago, in the county of Cook and State of Illinois, have invented a certain new and useful Improvement in Automobile Rear Bumpers, of which the following is a specification.

This invention relates to improvements in automobile rear bumpers and more particularly to rear bumpers consisting of two connected wing or bumper members, adapted to be positioned on the vehicle on either side of the spare wheel or tire carried at the rear, and to extend laterally to protect the fenders and portions adjacent thereto.

The object of the invention is to provide a bumper construction of adequate strength to afford the required protection against collision damage, combined with a minimum of weight and with attractiveness of appearance.

A preferred embodiment of the invention is disclosed in the accompanying drawings in which.

Figure 1:
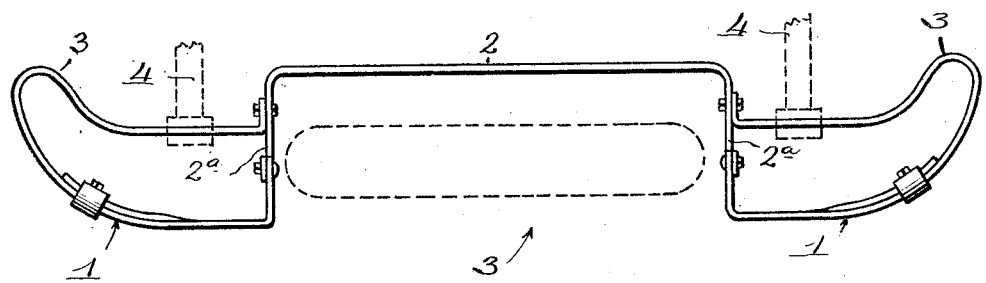
Figure 1 is a top plan view of the bumper.

Considering the bumper in its general aspects and the relationship of its parts to the vehicle on which it is mounted, the same consists of two bumper sections 1, 1, connected together by a single bar 2, offset forwardly from the exposed or impact faces of said bumper sections to provide a space for the spare wheel or tire 3, which projects from the rear of the vehicle body. The bumper is attached to the vehicle by means of suitable brackets 4, 4, fixed to the ends of the vehicle frame members and clamped to the bumper sections 1, 1, on either side of the spare wheel with the ends of said bumper sections extending laterally from the points of attachment to protect the rear fenders.

Referring to the bumper structure more in detail, it will be observed that the bumper sections 1, 1, consist of resilient bars bent in the form of elongated looped frames, extending laterally from the ends of the connecting bar 2, and terminating in looped end portions curving in a general forward direction. Inwardly from the looped ends is a widened area consisting of diverging portions of the bars spaced apart vertically, and extending inwardly to the space between the bumper sections in which the spare wheel is located. Moreover the bumper sections are offset in a transverse direction from the connecting bar 2, this being brought about by bending the end portions of the connecting bar at right angles, to form transverse arms $2^a$, $2^a$, to which the bumper sections are bolted.

Considering one of the bumper sections, the same consists of a single or main bar 5, bent into a substantially closed loop conforming to the general contour of the section, and consisting of a front portion $5^a$ to which the clamping members 4 are secured and having at its inner end an extremity $5^b$ bent at right angles and bearing flatwise against the arm $2^a$ of the connecting bar 2. The rear portion is straight throughout its inner end, but beyond the clamping members 4 the bar curves forwardly and thence is bent into a U-shaped loop $5^c$ to form the outer extremity of the bumper. Immediately in rear of the front portion is the impact portion of the bumper section, the outer end consisting of the end loop $5^c$ of the main bar 5, and an inner offset portion $5^d$ where said bar 5 is offset or curved in an upward direction and thence straight to a point opposite the arm $2^a$ of the connecting bar where it terminates in a forwardly bent end $5^e$.

Corresponding to the vertically offset portion $5^d$ of the bar 5 is a short auxiliary bar 6 overlapping the main bar near the end loop, and secured by means of a clamp 7. From the point of clamping this auxiliary bar is curved downwardly and thence straight to form the lower half of the widened impact area of the section. At its inner end the auxiliary bar is bent forwardly at right angles and terminates in a short end portion $6^a$, complementary to the end $5^e$ of the main bar just above.

Connecting these two ends of the bars together is a vertically arranged cross-bar 8, there being rivets 9, 9, passing through the overlapping ends. Between the ends of the bars $5^e$ and $6^a$ lies the outer end of the arm $2^a$ of the connecting bar, the same being bolted to the cross-bar 8 by a bolt 10. Immediately inward from the bolt 10 is another bolt 11, which passes through the arm 2ª and the bent end flange 5ᵇ of the main bar 5.

Figure 2:
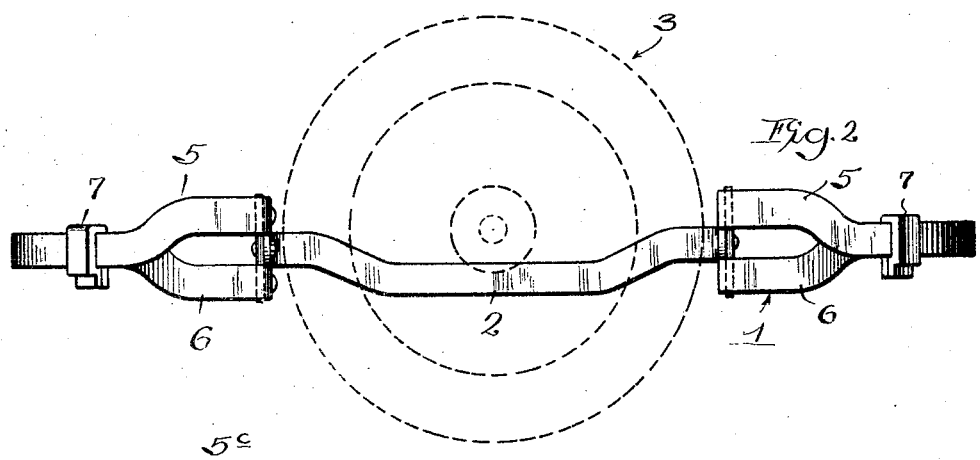
Figure 2 is a view in rear elevation of the bumper as attached to a vehicle and showing its relative position to the spare wheel.
Figure 3:
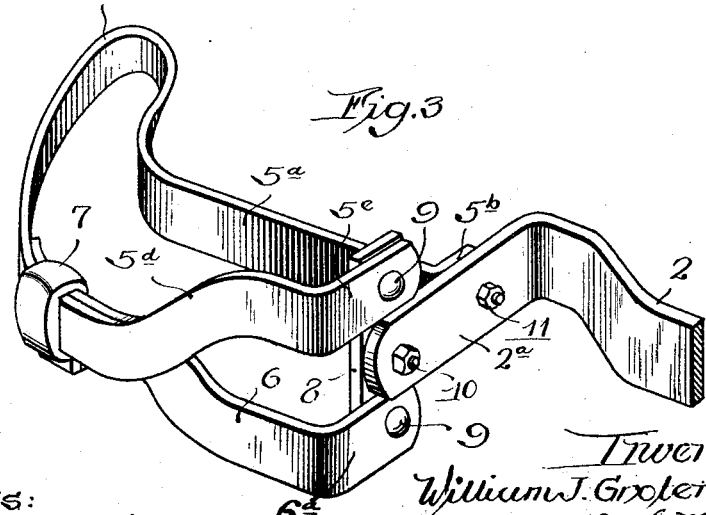
Figure 3 is a perspective view of one end section of the bumper.

As clearly shown in Figure 2, the central portion of the connecting bar is slightly offset in a downward direction, thus affording clearance for the supporting bracket of the spare wheel 3.

Having disclosed a preferred embodiment of the bumper, I claim as my invention:

1. A bumper adapted for mounting on a vehicle having a spare wheel mounted at the rear thereof and comprising end sections attached to the vehicle on opposite sides of said wheel, an intermediate bar extending between said end sections and having its ends bent rearwardly to provide a space for said wheel, each of said end sections consisting of a resilient bar bent in loop form, and an auxiliary bar spaced vertically from said first mentioned bar to form a widened impact area spaced inwardly from the ends of said sections, said first mentioned bar being connected at one end with said intermediate bar and at its opposite end with said auxiliary bar and means for connecting the adjacent ends of said bars together.

2. A bumper adapted for mounting on a vehicle having a spare wheel mounted at the rear thereof, comprising bumper sections attached to the vehicle on opposite sides of said wheel, an intermediate bar extending between said sections and behind said wheel and having its ends bent rearwardly, each of said end sections consisting of a resilient bar bent in loop form, with one end bolted to the adjacent arm inwardly from the end thereof, an auxiliary bar spaced vertically from said first mentioned bar to form a widened impact area, said bars being clamped together at their outer portions and bent forwardly into the plane of said arm at their inner ends, and a cross bar connecting the adjacent ends of said bars and bolted to the end of said arm.

3. A bumper adapted for mounting on a vehicle having a spare wheel mounted at the rear thereof, comprising bumper sections attached to the vehicle on opposite sides of said wheel, an intermediate bar extending between said sections and behind said wheel and having its ends bent rearwardly, each of said end sections consisting of a resilient bar bent in loop form to form a forwardly and a rearwardly disposed portion and an intermediate U-shaped end portion, an auxiliary bar fixed at one end to the rearwardly disposed portion of said first mentioned bar, said bars being offset vertically in opposite directions to form an impact area of increased width inwardly from said U-shaped end portion, and having their free ends bent forwardly into the plane of an arm, and a cross bar connecting the extremities of said bars, and connected with the end of said arm.

Signed at Chicago, Ill., this 2nd day of January, 1926.

WILLIAM J. GROTENHUIS.